United States Patent [19]

Adams et al.

[11] E Re. 29,537

[45] Reissued Feb. 14, 1978

[54] TORQUE BALANCED ROPE

[75] Inventors: William E. Adams, Hamden; Wilbert A. Lucht, Orange, both of Conn.

[73] Assignee: United States Steel Corporation, Pittsburgh, Pa.

[21] Appl. No.: 717,310

[22] Filed: Aug. 24, 1976

Related U.S. Patent Documents

Reissue of:

[64] Patent No.: 3,374,619
Issued: Mar. 26, 1968
Appl. No.: 545,726
Filed: Apr. 27, 1966

[51] Int. Cl.[2] ..... D07B 1/06; D02J 13/00

[52] U.S. Cl. ..... 57/148

[58] Field of Search ..... 57/139, 144, 145, 146, 57/147, 148, 149, 152

[56] References Cited

U.S. PATENT DOCUMENTS

| | | | |
|---|---|---|---|
| 952,161 | 3/1910 | Whyte | 57/147 |
| 1,429,529 | 9/1922 | Pyburn | 57/145 |
| 1,885,821 | 11/1932 | Green | 57/147 |
| 2,147,118 | 2/1939 | Ellsworth et al. | 57/147 |
| 2,372,142 | 3/1945 | Warren | 57/147 |
| 2,399,157 | 4/1946 | Warren | 57/147 |
| 3,035,403 | 5/1962 | Grimes et al. | 57/145 |
| 3,092,956 | 6/1963 | Naysmith | 57/147 X |
| 3,201,930 | 8/1965 | Stirling | 57/144 |

FOREIGN PATENT DOCUMENTS

| | | |
|---|---|---|
| 256,674 | 12/1966 | Austria. |
| 170,415 | 7/1934 | Switzerland. |

*Primary Examiner*—Donald Watkins
*Attorney, Agent, or Firm*—Forest C. Sexton

[57] ABSTRACT

*A torque balanced regular lay wire rope having from three to six strands spiraled together such that the angle of lay of the outer wires in each strand is at least two times greater than the angle of lay of the strands in the rope and said rope is in a stress relieved condition.*

9 Claims, 2 Drawing Figures

TORQUE BALANCED ROPE

Matter enclosed in heavy brackets [ ] appears in the original patent but forms no part of this reissue specification; matter printed in italics indicates the additions made by reissue.

This invention relates to a torque balanced rope, and in particular to a regular lay rope comprising between three and six strands. There are various types of torque balanced ropes, but those of which we have knowledge are made up of a plurality of layers of strands with the strands in one layer being laid up in the opposite direction to the strands in the adjacent layer. Thus the types of rope are limited and the operation is relatively expensive because at least two laying operations are required.

It is therefore an object of our invention to provide a regular lay torque balanced wire rope in which the strands are laid up in a single laying operation.

Another object is to provide such a rope which has non-rotating characteristics.

Figure 2:
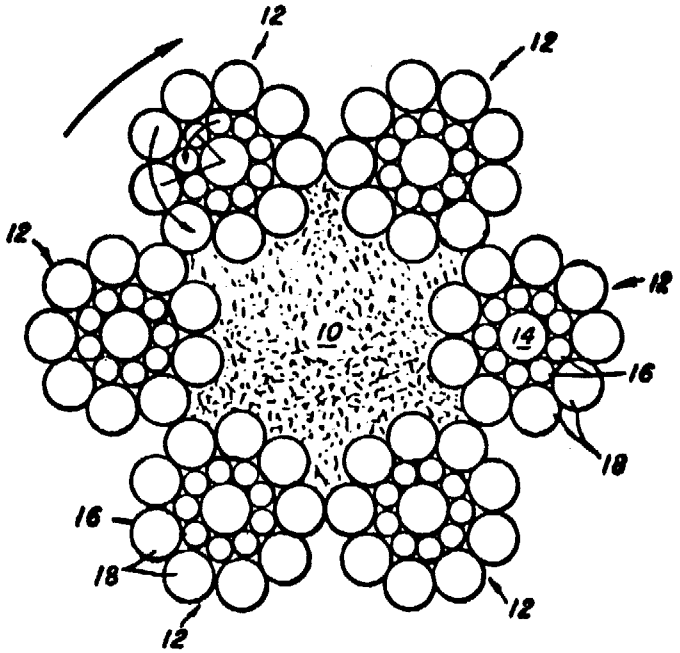
Figure 1:
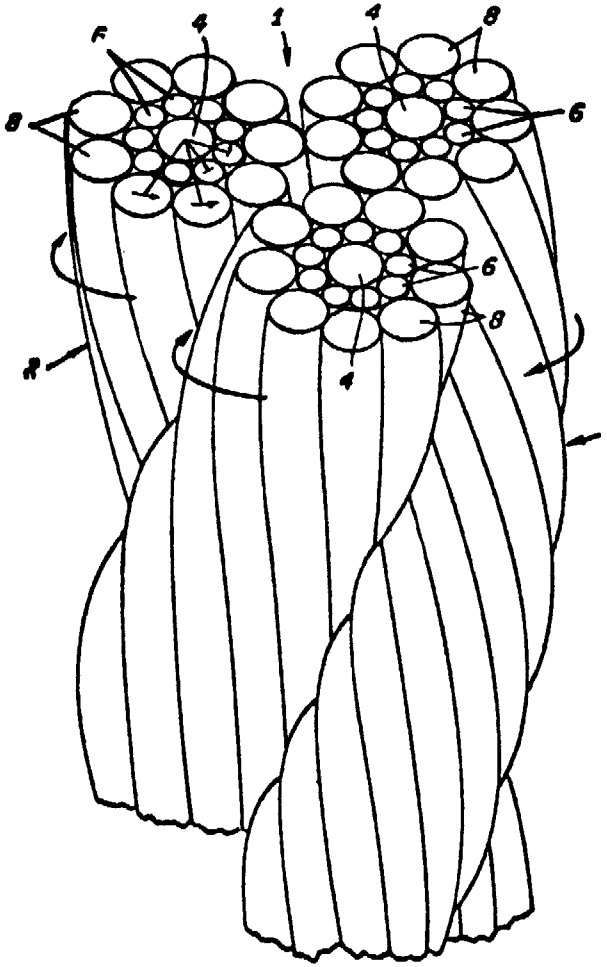

This and other objects will be more apparent after referring to the following specification and attached drawings, in which:

FIG. 1 is a perspective view of a 3 × 19 seale regular lay rope of our invention; and FIG. 2 is an end view of a 6 × 19 seale regular lay wire rope.

Referring more particularly to FIG. 1 of the drawings, reference numeral 1 indicates a wire rope consisting of three strands, each having a center core wire 4 surrounded by nine intermediate wires 6 and nine outer wires 8. According to our invention, the strands 2 are formed in the usual manner except that the lay is shorter than that normally used. The strands are formed, roll straightened and then stranded in a stranding machine where the strands are preferably partially preformed. We have found it advisable, and for most uses necessary, to stress relieve the formed rope. When the rope is made of steel, this is done at a temperature between 600° and 1150° F. The lay of the strand in the rope is longer than that normally used and it is necessary that the angle of lay of the outer wires in each strand be at least 1¾ times that of the angle of lay of the strands in the rope. This is necessary in order that the torque exerted by the rope will be approximately equal to the torque exerted by the strands. We have found further that a rope so constructed is relatively non-rotating, with the amount of rotation being no greater than 3° per foot of length under loads of up to 75% of the breaking strength of the rope, and in many instances the amount of rotation is even as low as 1° per foot. In the specific rope shown in FIG. 1, the angle of lay of the outer wires 8 is 21.8° and the angle of lay of the strands 2 is 10°. For best results it is desirable that the relationship between the angles of lay be at least 2 to 1 rather than 1¾ to 1.

The rope of FIG. 2 includes a core member 10 surrounded by six strands 12, each having a center wire 14, nine intermediate wires 16, and nine outer wires 18. Except for the lay of the wires in the strand and the lay of the strands in the rope, this rope is made in the usual manner. In other words, the strands are first formed and the strands then closed around the core 10. The strands are roll straightened and the rope stress relieved as in the first embodiment. The relationship between the angle of lay of the outer wire in each strand and the angle of lay of the strand in the rope is preferably greater than in a three strand rope. In the six strand rope shown, the angle of lay of the outer wires 18 is 24.5° and the angle of lay of the strands in the rope is 7°.

It will be understood that the strands may be of other constructions than those shown but will preferably be those constructions most commonly used. Also, the core shown in FIG. 2 may be replaced by other types of cores, such as an independent wire rope core. However, regardless of the construction of the strands, the relationships set forth above are necessary in order to obtain the desired characteristics.

The wires 6 and 8 are such that they tend to rotate in the direction of the arrows around the axis of wire 4, or in other words, under load they try to straighten out. On the other hand, the strands 2 under load tend to untwist from one another in the direction of the arrows and these two torques counterbalance one another so that the wires and strands will not move out of position. In like manner the wires 16 and 18 tend to rotate in the direction of the arrows and the strands 12 tend to untwist from one another in the direction of the arrows with the two torques counterbalancing each other.

While two embodiments of our invention have been shown and described it will be apparent that other adaptations and modifications may be made without departing from the scope of the following claims.

We claim:

1. A torque balanced regular lay *wire* rope comprising between three and six strands spiraled together, the angle of lay of the outer wires in each strand being at least [1¾] *2* times that of the angle of lay of the strands in the rope, *said rope being in the stress relieved condition,* the torque exerted by the rope being approximately equal to the torque exerted by the strands.

2. A torque balanced regular lay rope according to claim 1 in which the rope will rotate within 3° per ft. of length up to 75% of the breaking strength.

3. A torque balanced regular lay rope according to claim 1 in which the rope is stress relieved at a temperature of between 600° and 1150° F.

4. A torque balanced regular lay rope according to claim 3 in which the rope will rotate within 3° per ft. of length up to 75% of the breaking strength.

5. A torque balanced regular lay rope according to claim 1 in which consists of three strands spiraled together.

6. A torque balanced regular lay rope according to claim 5 in which the rope will rotate within 3° per ft. of length up to 75% of the breaking strength.

7. A torque balanced regular lay rope according to claim 6 in which the rope is stress relieved at a temperature of between 600° and 1150° F.

8. A torque balanced regular lay rope according to claim 1 which consists of six strands spiraled together, the angle of lay of the outer wires in each strand being at least two times that of the angle of lay of the strands in the rope.

9. A torque balanced regular lay rope according to claim 8 in which the rope will rotate within 3° per ft. of length up to 75% of the breaking strength.

* * * * *